United States Patent
Zalutskaya

(10) Patent No.: US 8,837,796 B1
(45) Date of Patent: Sep. 16, 2014

(54) SYSTEMS AND METHODS FOR MONITORING A DERMATOLOGIC CONDITION

(71) Applicant: Alena A. Zalutskaya, Jamaica Plain, MA (US)

(72) Inventor: Alena A. Zalutskaya, Jamaica Plain, MA (US)

(73) Assignee: Healthcare Content Solutions, Inc., Jamaica Plain, MA (US)

( * ) Notice: Subject to any disclaimer, the term of this patent is extended or adjusted under 35 U.S.C. 154(b) by 0 days.

(21) Appl. No.: 14/072,699

(22) Filed: Nov. 5, 2013

Related U.S. Application Data

(60) Provisional application No. 61/840,273, filed on Jun. 27, 2013.

(51) Int. Cl.
*G06K 9/00* (2006.01)
*G06T 7/00* (2006.01)

(52) U.S. Cl.
CPC ............ *G06T 7/0016* (2013.01); *Y10S 128/922* (2013.01); *Y10S 128/923* (2013.01)
USPC ............ 382/130; 382/128; 128/922; 128/923

(58) Field of Classification Search
USPC ................... 382/128, 130, 131; 128/922, 923
See application file for complete search history.

(56) References Cited

U.S. PATENT DOCUMENTS

| | | | | |
|---|---|---|---|---|
| 7,437,344 B2* | 10/2008 | Peyrelevade | .................... | 706/62 |
| 7,491,926 B1* | 2/2009 | Anderson et al. | ............. | 250/221 |
| 7,634,103 B2* | 12/2009 | Rubinstenn et al. | .......... | 382/100 |
| 7,952,537 B2* | 5/2011 | Allen et al. | ...................... | 345/32 |
| 7,984,010 B2* | 7/2011 | Campbell | ....................... | 706/58 |
| 8,138,991 B2* | 3/2012 | Rorberg et al. | .................... | 345/8 |
| 8,325,874 B2* | 12/2012 | Shi et al. | ......................... | 378/38 |
| 8,384,793 B2* | 2/2013 | Ciuc et al. | .................. | 348/222.1 |
| 8,491,926 B2* | 7/2013 | Mohammadi et al. | ......... | 424/443 |
| 8,532,254 B2* | 9/2013 | Pantsar et al. | .................... | 378/38 |
| 8,558,869 B2* | 10/2013 | Wu et al. | .................... | 348/14.08 |
| 8,600,194 B2* | 12/2013 | Doepke | ......................... | 382/294 |

* cited by examiner

Primary Examiner — Yosef Kassa
(74) Attorney, Agent, or Firm — Carr & Ferrell LLP

(57) ABSTRACT

A system for monitoring a dermatologic condition is provided. The system may include a processor configured to receive an image depicting a dermatologic condition and a swatch adjacent to the dermatologic condition, normalize the image to receive a normalized image, and detect one or more parameters associated with the dermatologic condition based on the normalized image. The system may then perform a search of previously taken images of the same dermatologic condition, compare them with a newly taken image, and advise a user whether any changes were detected.

24 Claims, 6 Drawing Sheets

SYSTEMS AND METHODS FOR MONITORING A DERMATOLOGIC CONDITION

RELATED APPLICATIONS

This Non-Provisional U.S. Patent Application claims the benefit of U.S. Provisional Patent Application Ser. No. 61/840,273 filed on Jun. 27, 2013, entitled "Mobile Health Application Method and System" which is incorporated by reference herein in its entirety.

TECHNICAL FIELD

This application relates generally to data processing and, more specifically, to systems and methods for monitoring a dermatologic condition.

BACKGROUND

Pigmented skin lesions and other skin irregularities may become a significant concern when they develop into malignant conditions, for example melanoma. Some skin lesions, however, are benign, and may only require some monitoring to ensure that there is no change in the character of the skin lesion. Melanoma, in contrast, presents significant risks because it can cause death if detected at later stages. Melanoma is a dangerous disease that may manifest itself as a skin lesion, for example a mole, that should be monitored. Changes to a skin lesion size, shape, and/or color are a basis for concern and warrant an evaluation. A patient's survival may depend on detecting melanoma in its early stages.

At present, monitoring of a skin lesion is often limited to checking for the "ABCD" (Asymmetry, Border Irregularity, Color, and Diameter) signs by a doctor without objective determinations of temporal changes in these signs.

Early detection of a potential melanoma is important in increasing a patient's survival chances and avoiding costly medical treatments. At-risk patients want to take more control of potential skin cancer threats. Besides, malpractice insurance and insurance settlements related to undetected melanoma cost doctors and insurance companies millions of dollars each year.

Accordingly, providing an easy, low cost solution for early detection of malignant skin conditions, particularly melanoma, may save lives, lower medical treatment expenses, and lower insurance settlement claims.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Provided is a method for monitoring a dermatologic condition. In certain embodiments, the method may include receiving an image depicting a dermatologic condition and a swatch adjacent to the dermatologic condition. The swatch may include a plurality of predefined color segments of a predefined size organized in a predefined pattern. The method may further include normalizing the image to receive a normalized image. The image normalization may include verifying that the boundaries of the dermatologic condition and the boundaries of the swatch do not intersect and are within the frame of the image, stretching and/or skewing the image till the swatch on the image has a predefined shape, and adjusting colors of the image till a plurality of predefined color segments of the swatch have predefined colors. The method may further include detecting one or more parameters associated with the dermatologic condition based on the normalized image. The one or more parameters associated with the dermatologic condition may include a size, a shape, a color, color uniformity, a dominating color, and the like. The method may further include storing the normalized image together with the one or more parameters to a database. The database may include a secured patient medical record database.

In certain embodiments, the method may further include analyzing the image to determine that the swatch and the dermatologic condition are fully depicted on the image and that the dermatologic condition has clear visible boundaries.

In certain embodiments, the method may further include assigning a human-readable tag to the normalized image. The human-readable tag may include information associated with the dermatologic condition.

In certain embodiments, the method may further include receiving a panoramic image of a body part containing the dermatologic condition and mapping the image against the panoramic image to assign a location tag associated with the body part to the image.

In certain embodiments, the method may further include searching the database to detect at least two temporally-different normalized images of the dermatologic condition and, upon detecting the at least two temporally-different normalized images of the dermatologic condition, comparing to detect one or more changes in the one or more parameters associated with the dermatologic condition.

Provided also is a system for monitoring a dermatologic condition. In certain embodiments, the system may include a processor and a memory comprising computer-readable instructions for execution by the processor. The processor may be configured to receive an image depicting a dermatologic condition and a swatch adjacent to the dermatologic condition. The processor may be further configured to normalize the image to form a normalized image and, based on the normalized image, detect one or more parameters associated with the dermatologic condition. Finally, the processor may be configured to store the normalized image together with the one or more parameters to a database.

Provided also is a non-transitory computer-readable medium comprising instructions, which when executed by one or more processors, perform the following operations. In one operation, an image depicting a dermatologic condition and a swatch adjacent to the dermatologic condition may be received. In a further operation, the image may be normalized to form a normalized image. In yet another operation, one or more parameters associated with the dermatologic condition may be detected based on the normalized image. In a further operation, the normalized image together with the one or more parameters may be stored to a database.

The following detailed description, together with the accompanying drawings, provide a better understanding of the nature and advantages of the present disclosure.

BRIEF DESCRIPTION OF DRAWINGS

The patent or application file contains at least one drawing executed in color. Copies of this patent or patent application publication with color drawing(s) will be provided by the Office upon request and payment of the necessary fee.

Embodiments are illustrated by way of example and not limitation in the figures of the accompanying drawings, in which like references indicate similar elements and in which.

DETAILED DESCRIPTION

Figure 1:
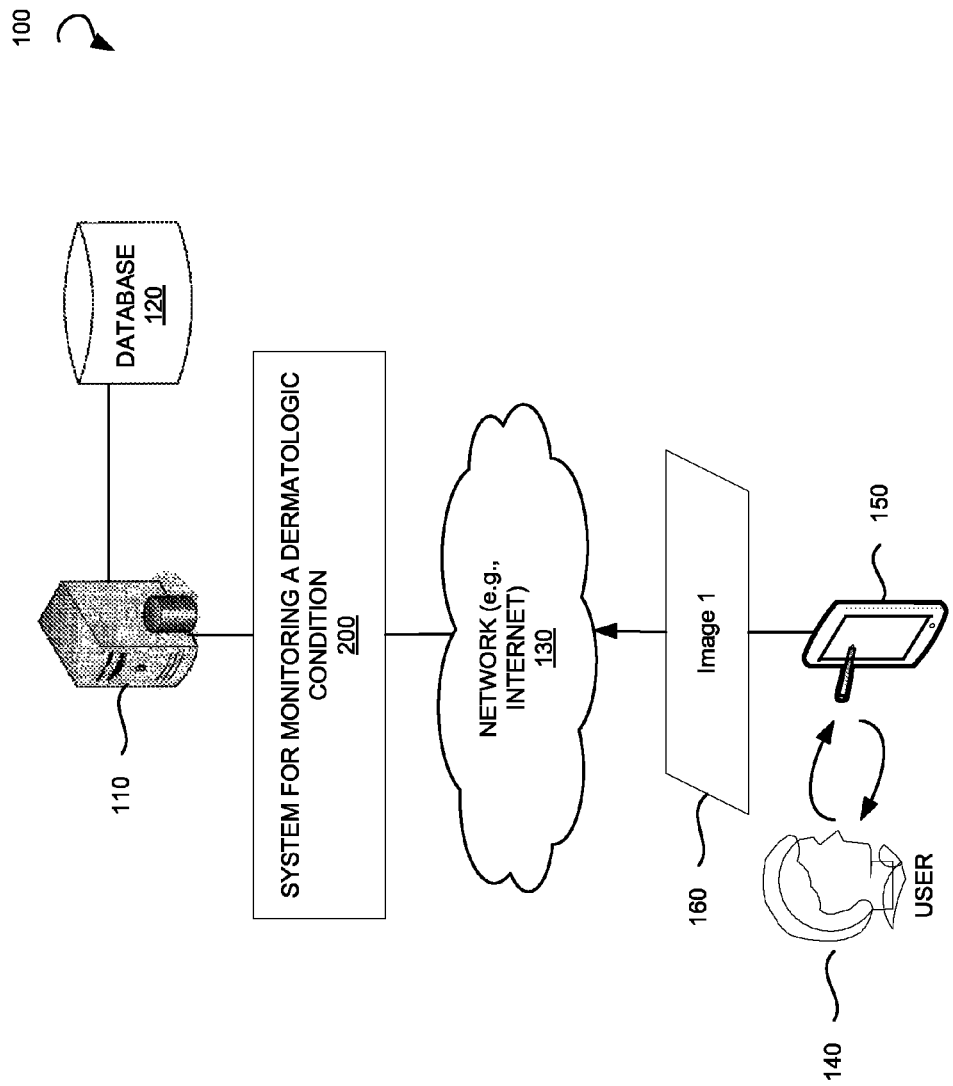
FIG. 1 shows a block diagram illustrating a sample environment within which methods and systems for monitoring a dermatologic condition may be implemented, in accordance with an exemplary embodiment.

In the following description, numerous specific details are set forth in order to provide a thorough understanding of the presented concepts. It should be understood, however, that the presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In accordance with various embodiments and the corresponding disclosure thereof, computer-implemented methods and systems for monitoring a dermatologic condition are provided. The technology disclosed herein may allow a general public (public not trained in the medical profession field) to monitor skin lesions and other dermatologic entities by utilizing a camera built into a user device. Users of the present technology may be able to take pictures of the dermatologic entities that they want to monitor, catalog pictures based on the location of where the dermatologic condition is found on a human body (e.g. left palm), normalize images before storing them in a storage device, compare normalized images of the same dermatologic condition taken at different times to determine if any noticeable change occurred to the dermatologic condition, such as change in dermatologic condition shape, change in a dermatologic condition color, or both, assign human readable tags to images like "show to my dermatologist at the next visit," assign quantitative characteristics to the photographed dermatologic condition like size, shape classification (circle, oval, irregular etc.), color uniformity, dominating color, and the like.

In certain embodiments, the present technology may be used by dermatologists, general practitioners, and consumers. A dermatologist may use the present technology for any patient. The dermatologist may use a harness discussed below in regard to FIG. 4 while capturing images of a dermatologic condition. The images may be stored in a secure external location and images, along with image annotations, may be stored in a patient medical record system. The dermatologist may disclose the images along with her comments to another dermatologist (access rules may be defined by the responsible dermatologist).

The primary focus of a general practitioner is to catch a change in a dermatologic condition early on and refer a patient to a dermatologist. The general practitioner may use the present technology for a number of patients and may store data in the secure external store that is integrated with a patient medical record system. The general practitioner may request a consult from the dermatologist (for example, the image may be disclosed to a trusted dermatologist).

A consumer may be a single user or a limited number of users (e.g., a family). The consumer may store images on a user device or in external data storage. The consumer may share their data with a general practitioner or a dermatologist by transferring the data device-to-device via Near Field Communication (NFC), Bluetooth, Bluetooth Low Energy, or any other appropriate data transfer method, including wired and wireless. The consumer may upload their images to a trusted provider to the data store supplied by the provider, or a third party that can guarantee data security. The consumer may post an image history to a micro exchange and get non-binding opinions for a monetary compensation, for example one dollar per opinion. The opinion is not a diagnosis; it is an opinion like "I've seen a thousand similar cases and had 15 that were diagnosed as melanoma."

The methods disclosed herein may be implemented in various types of electronic user devices including tablet Personal Computers (PCs), laptops, mobile and smart phones, computers, and any other electronic devices configured to display digital content and interact with remote servers via a network such as the Internet. In some example embodiments, the user devices may merely embed a web browser allowing users to browse web sites through the Internet and virtually interact with a remote system for monitoring a dermatologic condition.

The present technology may be implemented as a mobile health application for use on a smartphone or other digital device having a camera and may be downloadable or web-based. Additionally and/or alternatively, the present technology may provide a website for remote evaluation of dermatologic entities by professionals at a fraction of the cost of a visit to a doctor. In this manner, low cost, high-quality health care including melanoma screening may be obtained.

The mobile health application may be downloaded to a mobile device. A user may register with a central system operating in a cloud-based computer environment. The user may capture images of their own skin or another person's skin that they are concerned about or simply want to monitor for changes. When taking an image, the user may place a color swatch adjacent to the area of interest. The color swatch may be sent by mail by an administrator of the system, purchased at a store, or downloaded and printed on a color printer. In the case of printing the color swatch, care should be taken to ensure that the colors on the swatch are identical to the standard color swatch to ensure that color normalization is effective. Likewise, the size and shape of the color swatch should be predetermined, and therefore a printed color swatch should be exactly the same, in terms of size and shape, as a standard color swatch that may be purchased or printed in a central location.

The color swatch may be used to determine the shape and/or color of a dermatologic condition. Since the swatch has a predefined shape and color scheme, the swatch may be used to normalize color and dimensions of the image of the dermatologic condition taken at any moment in time. The swatch may have a collection of standardized color rectangles of a predetermined size organized in a predetermined pattern. Image normalization is important in ensuring that the system will provide an accurate answer to the question of whether the skin lesion has changed. Light conditions affect how images appear on a photograph. Distance between a camera and a photographed object may affect how the size of the photographed object is perceived. When the dermatologic condition is photographed in a way that the standardized swatch fully appears in the picture, then the swatch may be used to transform the image of the dermatologic condition to a state of a photograph taken under ideal conditions such as: the camera is positioned at a 90 degree angle to the plane where the dermatologic condition resides, light conditions are predefined, and distance from the camera to the skin lesion is predefined.

The normalization process may be summarized as follows. Color may be normalized by identifying the colors on the swatch and identifying any differences in hue or tone between the predetermined colors on the swatch and the image of the swatch in the photograph. By adjusting the colors in the photograph so that the image of the swatch in the photograph matches the actual colors on the swatch as predefined and known, the colors in the photograph are normalized. In this manner, the color of the dermatologic condition may be compared to other images of that same dermatologic condition, despite differences in the lighting and or settings of the camera used to capture the image. Size and shape normalization are discussed in regard to FIG. 4 below.

A user may upload images of sections of their skin to a central server system or may store images locally on a mobile device used to capture images. The user may then track changes in the dermatologic condition being photographed and tracked by taking additional photographs including the swatch at periodic intervals, for instance every week, every month, every other month, every six months, or any other periodic or non-periodic interval. The user may upload the images for review by a trusted third party, for instance a doctor, a family member, and/or a friend. Additionally, a user may submit their images to an online forum managed by the present system to provide opinions from professionals with respect to treatment, for example, "you should go see a doctor," or "you should continue to observe the skin condition for any changes." The forum may include a compensation scheme, in which the user pays the professional for the opinion. Disclaimers of liability for the system administration may be provided to both users and user-professionals to avoid liability on the part of the system managers or owners for opinions provided by professionals using the system.

Referring now to the drawings, FIG. 1 is a block diagram showing a sample environment within which methods and systems for monitoring a dermatologic condition may be implemented, according to an example embodiment. FIG. 1 shows an architecture 100 which may include a network 130, a client device 150, a user 140, a system for monitoring a dermatologic condition 200 (also referred to as system 200), a database 120, and a server 110. The user 140 may communicate over the network 130 with the system for monitoring a dermatologic condition 200 having one or more connected databases 120.

The network 130 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 130 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking. The network 130 may include a network of data processing nodes that are interconnected for the purpose of data communication.

The client device 150, in some example embodiments, may include a Graphical User Interface (GUI) for displaying a user system interface. The client device 150 may include a desktop computer, laptop computer, tablet computer, cell phone, smart phone, gaming device, or the like. The user 140, in some example embodiments, may include a person interacting with the user system interface via the client device 150. The user 140 may periodically interact with the system for monitoring a dermatologic condition 200 and provide or update various data associated with newly taken images of a dermatologic condition on the user's skin. This information may be retained in the database 120.

In some example embodiments, the user 140 may take an image 160 of a dermatologic condition by pointing a camera towards the dermatologic condition. When taking the image 160, the screen of the camera should outline both the dermatologic condition and a color swatch that will be captured by the camera.

Figure 2:
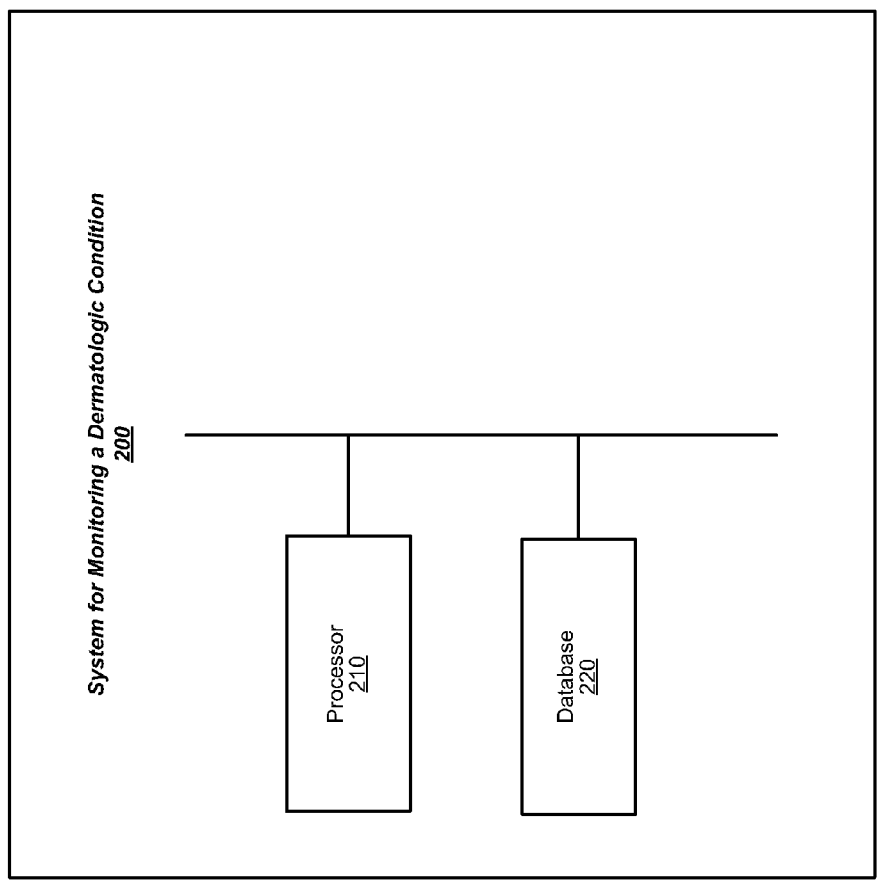
FIG. 2 shows a schematic representation of elements of a system for monitoring a dermatologic condition, in accordance with certain embodiments.

FIG. 2 is a schematic representation of elements of a system for monitoring a dermatologic condition 200, in accordance with certain embodiments. The sample system may comprise a processor 210. The processor 210 may be configured to receive an image depicting a dermatologic condition and a swatch adjacent to the dermatologic condition. The processor may be configured to analyze the quality of the received image, determine if the swatch is fully visible in the image and if the quality of the swatch image is acceptable (i.e., the swatch appears to be in a single plane without any bends that would affect the quality of the image analysis). The processor may be configured to determine whether the dermatologic condition on the image has clear margins (i.e., that the lesion is fully captured without any part thereof being cut off either by being covered by the swatch or by positioning of the camera).

The processor 210 may be further configured to normalize the image to receive a normalized image. The processor may be configured to normalize colors of the dermatologic condition on the image by comparing colors of the dermatologic condition with the colors of the swatch, and by stretching the image (along with the swatch) so that the swatch appears to be at a 90 degree angle to a camera and a specified distance from the camera (plane normalization). In certain example embodiments, a user may be presented with a 3D model of a human body so that the user can easily point at a place on the model where the image was taken.

The processor 210 may be further configured to detect one or more parameters associated with the dermatologic condition based on the normalized image. The one or more parameters may include a location of the dermatologic condition, its size, shape, color, color uniformity, dominating color, and the like. The processor 210 may be further configured to store the normalized image together with the one or more parameters to a database. The image may be stored in a secure external location, such as a secured patient medical record database. In certain embodiments, the processor 210 may be further configured to assign a human-readable tag to the normalized image, with the human-readable tag including information associated with the dermatologic condition.

In certain embodiments, the processor 210 may be further configured to report about the usage patterns of the system 200 for monitoring a dermatologic condition, specifically when the system 200 was used, where the system 200 was used, how long the user interaction with the system 200 lasted, and what functions were used. In certain embodiments, the processor 210 may be further configured to search a dermatologic condition by location on a body part, when the image was taken, and tags assigned by a user.

An exemplary system may also include a system database 220 to store personal information associated with the user. User information may comprise user's name, address, age, weight, relevant habits such as the amount of time spent outdoors, skin products usage pattern, lifestyle information, and the like. The user information may be provided by the user upon registration with the system 200 and be updated by the user over time. Additionally, the system database 220 may be configured to continuously gather and store newly taken images of dermatologic entities.

Figure 3:
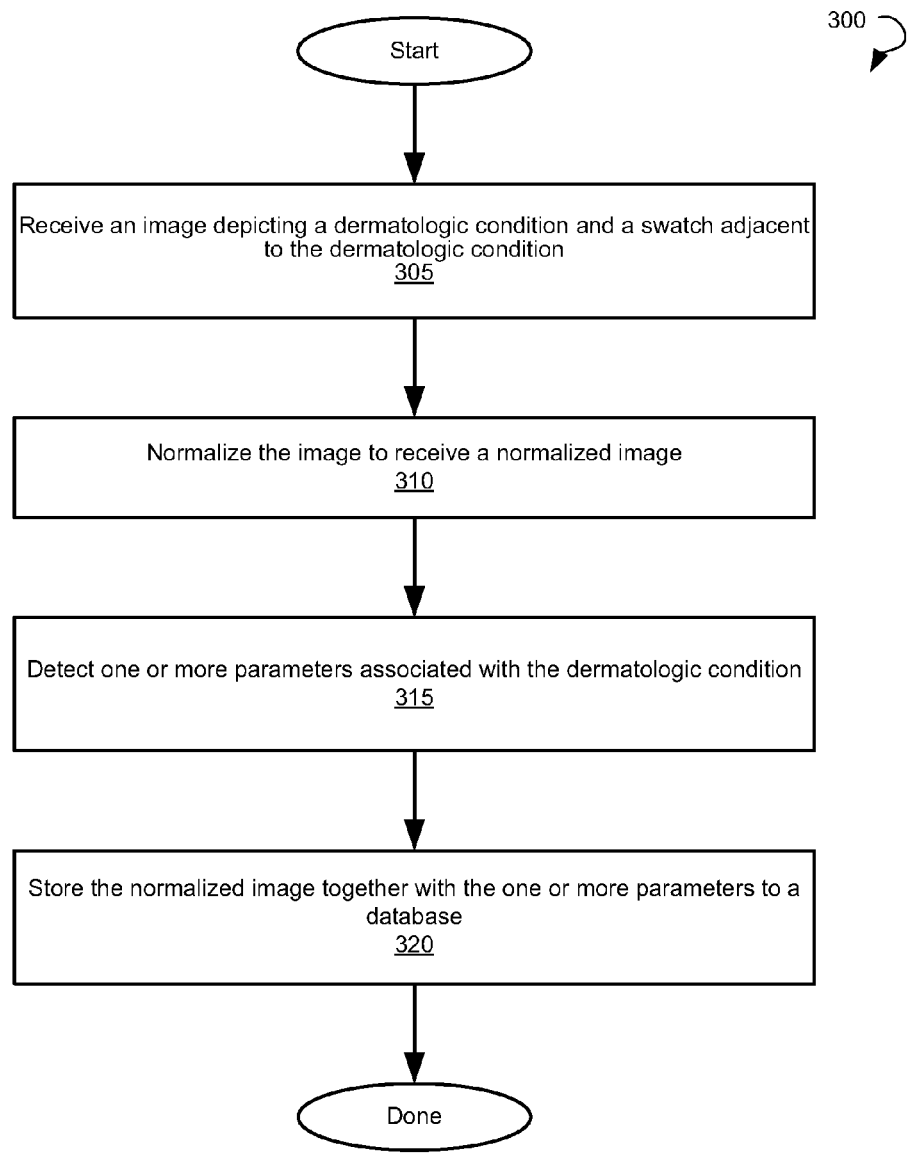
FIG. 3 shows a flow chart illustrating a method for monitoring a dermatologic condition, in accordance with an example embodiment.

FIG. 3 shows a flow chart illustrating a method for monitoring a dermatologic condition 300, in accordance with an example embodiment. The method 300 may commence with receiving an image depicting a dermatologic condition and a swatch adjacent to the dermatologic condition, at operation 305. In certain example embodiments, when a user tries to check a dermatologic condition on his left leg, the first step may be to identify the general location of the problem area. There may be two options. If this is the first time that the user is taking an image of the dermatologic condition, the user may take a picture of the left leg so that the image is recognizable to the user as "left leg." The problem area might be too small to pass a judgment. Such image may be referred to as "panoramic." If this is not the first time that the user is taking a picture of the dermatologic condition, the user may select a recognizable panoramic image of his left leg from the database. Thereafter, the user may take a close up image of the problem area. The image may be taken in a way that the swatch is clearly visible in the taken image and the swatch image is of acceptable quality.

At operation 310, the image may be normalized to receive a normalized image of the dermatologic condition. Normalization may include the following steps: 1) making sure that the image and the area associated with the dermatological condition are within the frame of the image, including determining the boundaries of the dermatologic condition, determining the boundaries of the swatch, checking that boundaries of the area and the swatch do not intersect, and checking that the boundaries of the dermatologic condition and the swatch are within the frame of the image; 2) making sure that the swatch is in focus, including finding boundaries of the swatch, finding color fillers of the swatch, and checking that the ratio of the width of the swatch boundaries to the width of the swatch color segments is within acceptable range; 3) performing plane normalization of the whole image by stretching and/or skewing the whole image till the swatch has a predefined shape (e.g. square with equal sides and four right angles); 4) performing color normalization of the whole image till individual color segments of the swatch have predefined colors.

The purpose of checking that the ratio of the width of the swatch boundaries to the width of the swatch color segments is within acceptable range is to determine that the photograph is in focus. The swatch has borders and those borders should not be blurry. To check for blurriness, the swatch border is identified and the border width can be compared to the width of the adjacent color segment. For example, the border may have a width that is 5% of the width of the adjacent color segment (e.g., the ratio of the widths is 1/20). If the image is in focus, then this ratio should be preserved. However, if after taking a picture, the border width is 12% of the adjacent color segment, then the border is blurred, and therefore the image of the swatch is not in focus. The exemplary system may note this blurring and flag for the user that another image should be taken. Since it is not possible to check that the mole is in focus, as the mole's border may be irregular, the border of the swatch is used to verify that the image is in focus. Additionally, the border, individual sub-segments, and/or other predefined sections of the swatch may be compared to other sections of the swatch to verify that the swatch is not inordinately bent when the image is taken. This may be done by checking that the ratio of length to width of each differently colored sub-segment is the same, and is also the same as the overall ratio of length to width of the swatch.

In certain example embodiments, after the image is normalized, the one or more dermatologic entities may be found and a millimeter (or fraction of millimeter) lattice may be superimposed on top of the dermatologic entities. This lattice will give a user instant visual feedback of the sizes of the dermatologic entities.

At operation 315, one or more parameters associated with the dermatologic condition may be detected automatically by the system based on the normalized image of the dermatologic condition. The one or more parameters associated with the dermatologic condition may include a size, a shape, a color, color uniformity, and a dominating color.

The method 300 may proceed at operation 320 with storing the normalized image together with the one or more parameters to a database. In certain example embodiments, a user may be presented with the panoramic image, wherein each dermatologic condition of interest (mole or wound) becomes a clickable button. The user may click on the button and receive a mapping from the panoramic image to the close up image. The swatch may be used to tie the close up image to the panoramic image, as the swatch will stay in the same location relative to the dermatologic condition in both panoramic and close up images.

In certain example embodiments, if there is more than one image of the dermatologic condition and time stamps of the images are sufficiently different, the images may be compared to each other, automatically and by a processor and/or machine intelligence, and the user may be alerted if there are any changes between the first and the second images. It is important to note that the position of a camera might change between taking two images of the dermatologic condition. Actually, even if the camera is positioned in exactly the same way in relation to the dermatologic condition, the position of the swatch may cause the image to rotate during normalization process. In order to minimize false positives, the first image and the second image may be rotated so that the second image appears as similar as possible to the first image.

In certain example embodiments, the size and/or shape of the images and color composition of the images may be compared. For example, the mole in question has a size of 4×6 mm. At the next measurement, the size is detected to be 6×4 mm. In such case it is obvious that a camera was just rotated 90 degrees and no change in mole size really happened. In certain example embodiments, a user may be presented with both the first and the second images on the same screen one above the other to manually examine the change (if any). The user may be provided with a functionality to rotate one of the images till the user is satisfied that the images look sufficiently similarly oriented. At this point, the images may superimpose each other or be superimposed by the lattice so that it is clear to the user how exactly it changed. The superposition of images may be performed automatically or manually, and may include each image being projected at a 50 percent transparency amount, or another appropriate amount, during the superposition process.

Figure 4:
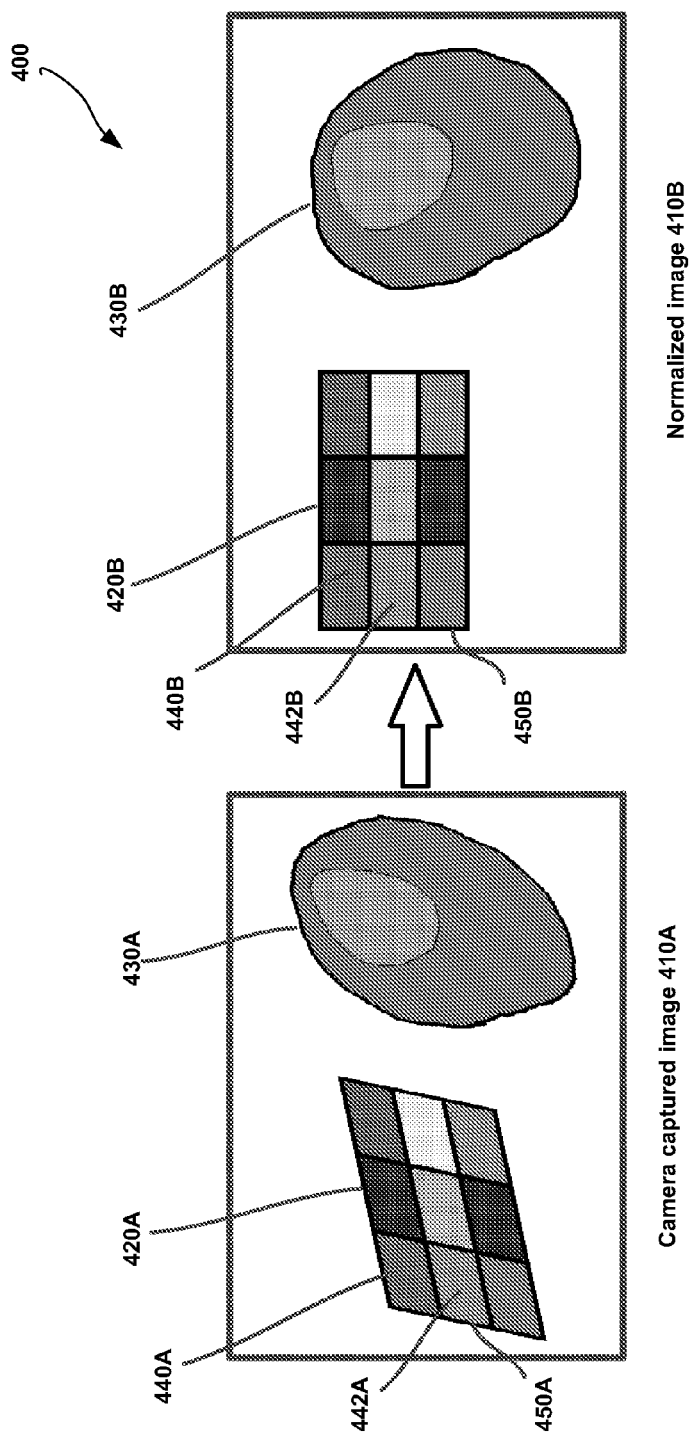
FIG. 4 shows an image normalization process, in accordance with an example embodiment.

FIG. 4 shows an image normalization process 400, in accordance with an example embodiment. A user may place the swatch on the skin next to a skin lesion or other dermatologic condition, and then may take a photo that includes both the dermatologic condition and the swatch in the frame. Since a camera may be at an angle other than 90 degrees from the surface of the skin, for example, 75 degrees or any angle less than 90 degrees, the shape and size of the dermatologic condition may be distorted during the image capture process. In order to normalize both the shape and the size of the skin condition, the system performs plane and size normalization.

A camera-captured image 400A illustrates the image as it was taken by a camera with an off-perpendicular focal plane. In a camera-captured image 400A, skewed swatch 420A is stretched and skewed (the swatch does not appear rectangular in the image). Skewed swatch 420A includes skewed sub-segments 440A and 442A, and also skewed border 450A. Due to stretching and skewing, a system for monitoring dermatologic condition recognizes that skewed dermatologic condition 430A is also stretched and skewed. The plane normalization performed by the system stretches and skews the camera-captured image 400A to arrive at a normalized image 400B. Stretching and skewing is complete when swatch 420B has the expected geometry (the predetermined geometry of the actual swatch, as known). The expected geometry of swatch 420B includes a rectangular shape with a predefined ratio of the sides. For example, with a square swatch, the ratio is 1:1. By altering the camera-captured image, skewed dermatologic condition 430A is also stretched and skewed into dermatologic condition 430B with a shape that corresponds to the actual shape of the dermatologic condition as would be imaged by an image capture device having a perpendicular focal plane. The end result may be a photograph of the dermatologic condition as if it was photographed with the ideal placement of the camera. Stretching and skewing may alternatively include shrinking or enlarging as necessary to make the swatch in the normalized image 410B correspond to the dimensions of the swatch 420B as known. The normalized image 410E may have an irregular edge, which the system may ignore or crop as necessary for appropriate viewing of the target dermatologic condition.

In plane normalization, an image may be taken by a camera at an angle other than 90 degrees (distorted). Since the swatch has a predetermined shape, for instance a rectangle, and a predetermined dimension, the system may reverse the distortion introduced by the off-perpendicular focal angle by distorting the image to make the swatch appear in the normalized image with the size and shape that are predetermined by the system. By reversing the distortion of the swatch using image wide manipulations, the distortion of the dermatologic condition is also reversed, such that the normalized image is a normalized view of the dermatologic condition. Likewise, the size of the normalized image may be changed to make the swatch appear to be the same size as the predetermined size, thereby also modifying the size of the dermatologic condition. In this manner, the image of the dermatologic condition is normalized and may then be compared with other images of the dermatologic condition taken at different times from different distances, and from different angles.

Additionally or alternatively, prior to or after plane normalization, the system performs color adjustment. Colors in the swatch may be predetermined. For example, the color of skewed swatch 420A in camera captured image 410A includes skewed sub-segments 440A and 442A, and also skewed border 450A. Since the color the swatch is known to correspond to the color of swatch 420E in normalized image 410B, the colors throughout camera captured image 410A may be adjusted until skewed sub-segments 440A and 442A match the colors of sub-segments 440E and 442B, respectively. Further, before, during, or after plane normalization, size adjustment (or normalization) may be performed since the swatch is of a predetermined size.

Figure 5:
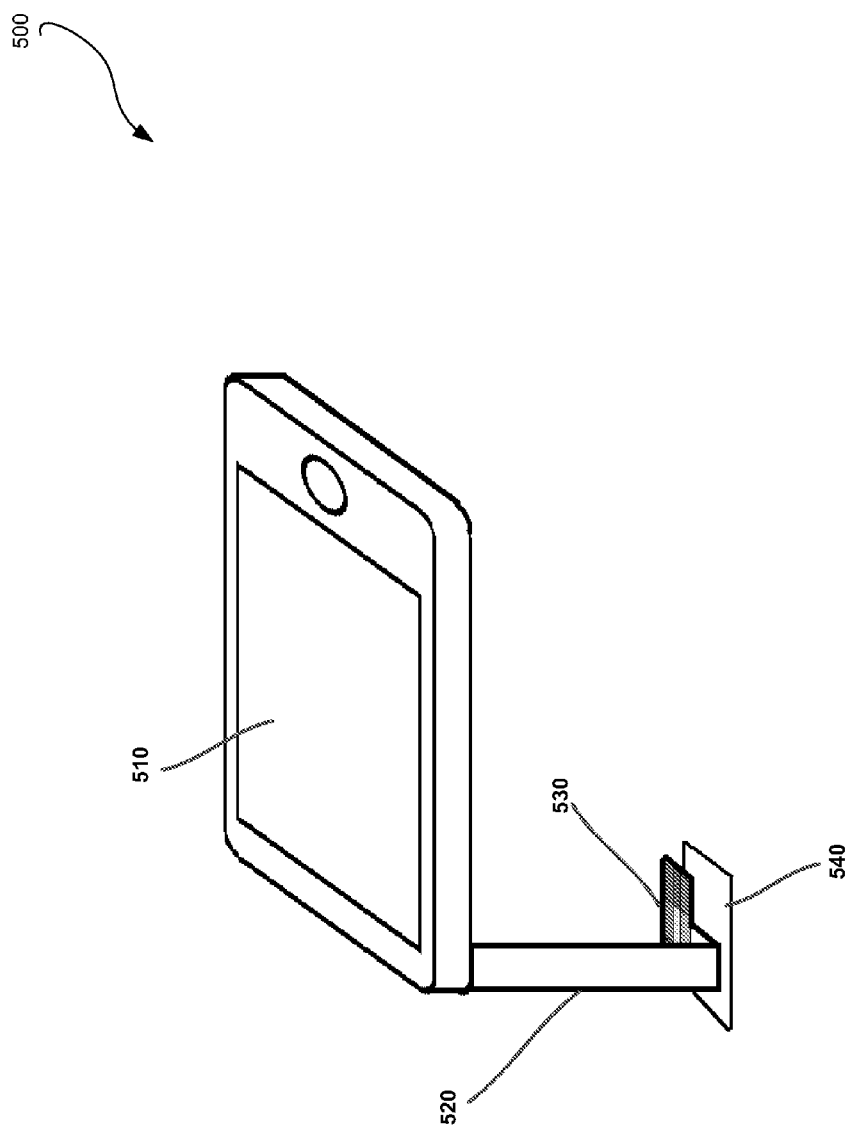
FIG. 5 shows a harness with an attached swatch and disposable skin contacting strip, in accordance with an example embodiment.

FIG. 5 shows harness system 500 including a harness 520 with an attached swatch 530 and skin contacting strip 540, in accordance with an exemplary embodiment of the present technology. The harness 520 shown in FIG. 3 may be used by a skin care professional that may see many patients each day. In order to capture and record an image of a dermatologic condition using the system provided herein, the professional may use a digital image capture device 510, which may be a smartphone, tablet computer, digital camera, personal digital assistant (PDA), or any other image capture device. The digital image capture device 510 may include the harness 520 coupled to the digital image capture device 510 that may be detached from the digital image capture device 510. The harness 520 may extend from the digital image capture device 510 at a right angle from a plane of the lens of the digital image capture device 510. The harness 520 may include a permanent, temporary, or bendable end section upon which the swatch 530 as described above may be permanently or temporarily affixed. The bendable end section may be fashioned to rest against the skin of a patient, and may therefore have a skin contacting strip 540 to be temporarily affixed to the skin-side of the bendable end section. Skin contacting strip 540 may be sterile and/or disposable. In this manner, the skin professional may safely use the digital image capture device 510 and the harness 520 with multiple patients without fear of cross-contamination by disposing of the skin contacting strip 540 after seeing a patient and replacing it with a new, skin contacting strip 540 before seeing the next patient.

Figure 6:
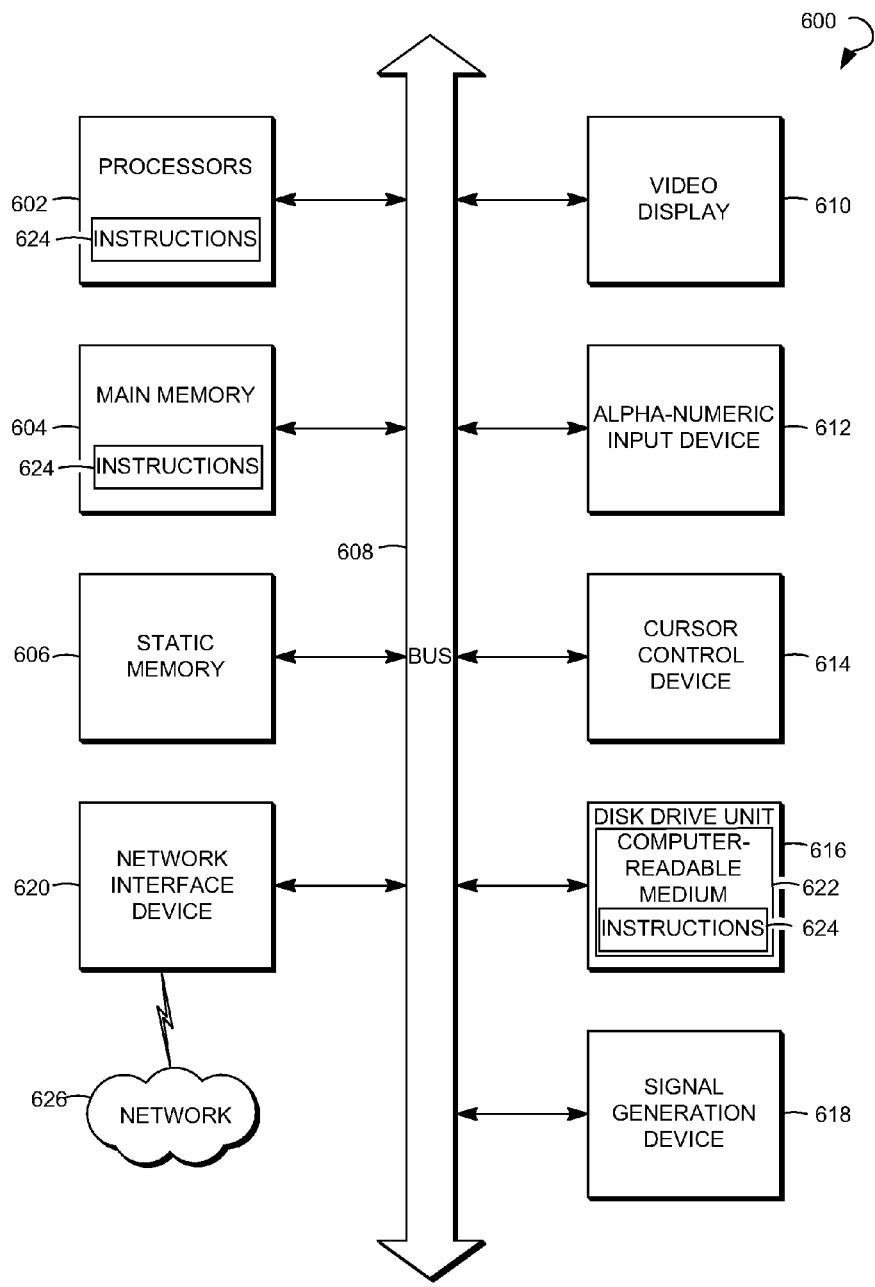
FIG. 6 shows a diagrammatic representation of an exemplary machine in the form of a computer system, within which a set of instructions for causing the machine to perform any one or more of the methodologies discussed herein is executed.

FIG. 6 illustrates a diagrammatic representation of an example machine in the form of a computer system within which a set of instructions for causing the machine to perform any one or more of the methodologies discussed herein may be executed. A computer system 600 may include a set of instructions for causing the machine to perform any one or more of the methodologies discussed herein. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a tablet computer, a cellular telephone, a smartphone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor or multiple processors 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 may also include an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a computer-readable medium 622, on which is stored one or more sets of instructions and data structures (e.g., instructions 624) embodying or utilized by any one or more of the methodologies or functions described herein. The instructions 624 may also reside, completely or at least partially, within the main memory 604 and/or within the processors 602 during execution thereof by the computer system 600. The main memory 604 and the processors 602 may also constitute machine-readable media.

The instructions 624 may further be transmitted or received over a network 626 via the network interface device 620 utilizing any one of a number of well-known transfer protocols (e.g., Hyper Text Transfer Protocol (HTTP)).

While the computer-readable medium 622 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like.

The example embodiments described herein may be implemented in an operating environment comprising software installed on a computer, in hardware, or in a combination of software and hardware.

The components provided herein are those typically found in computer systems that may be suitable for use with embodiments of the present technology and are intended to represent a broad category of such computer components that are well known in the art. Thus, the computer system 600 may be a PC, hand held computing system, telephone, mobile computing system, workstation, server, minicomputer, mainframe computer, or any other computing system. The computer system 600 may also include different bus configurations, networked platforms, multi-processor platforms, and the like. Various operating systems may be used including Unix, Linux, Windows, Mac OS, Palm OS, Android, iOS (known as iPhone OS before June 2010), QNX, and other suitable operating systems.

It is noteworthy that any hardware platform suitable for performing the processing described herein is suitable for use with the embodiments provided herein.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

Thus, systems and methods for monitoring a dermatologic condition have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for monitoring a dermatologic condition, the method comprising:
   receiving an image depicting a dermatologic condition and a swatch adjacent to the dermatologic condition;
   normalizing, based on the swatch in the image, by a processor, the image to form a normalized image;
   detecting one or more parameters associated with the dermatologic condition based on the normalized image; and
   storing the normalized image together with the one or more parameters to a database.

2. The method of claim 1, further comprising analyzing the image to determine that the swatch and the dermatologic condition are fully depicted in the image and that the dermatologic condition has clear visible boundaries.

3. The method of claim 1, further comprising assigning a human-readable tag to the normalized image, the human-readable tag including information associated with the dermatologic condition.

4. The method of claim 1, wherein the one or more parameters associated with the dermatologic condition include one or more of: a size, a shape, a color, color uniformity, and a dominating color.

5. The method of claim 1, wherein the swatch includes a plurality of predefined color segments organized in a predefined pattern, each of the plurality of predefined color segments having a predefined size.

6. The method of claim 1, further comprising:
receiving user-specified information associated with a location of a dermatologic condition on a human body; and
assigning a location tag to the image based on the user-specified information.

7. The method of claim 1, further comprising:
receiving a panoramic image of a body part containing the dermatologic condition; and
mapping the image against the panoramic image to assign a location tag associated with the body part to the image.

8. The method of claim 1, wherein the database comprises a secured patient medical record database.

9. A system for monitoring a dermatologic condition, the system comprising:
a processor;
a memory comprising computer-readable instructions for execution by the processor, wherein the processor is configured to:
receive an image depicting a dermatologic condition and a swatch adjacent to the dermatologic condition;
normalize, based on the swatch in the image, the image to form a normalized image;
detect one or more parameters associated with the dermatologic condition based on the normalized image; and
store the normalized image together with the one or more parameters to a database.

10. The system of claim 9, wherein the processor is further configured to analyze the image to determine that the swatch and the dermatologic condition are fully depicted in the image and that the dermatologic condition has clear visible boundaries.

11. The system of claim 9, wherein the processor is further configured to assign a human-readable tag to the normalized image, the human-readable tag including information associated with the dermatologic condition.

12. The system of claim 9, wherein the one or more parameters associated with the dermatologic condition include one or more of: a size, a shape, a color, color uniformity, and a dominating color.

13. The system of claim 9, wherein the swatch includes a plurality of predefined color segments organized in a predefined pattern, each of the plurality of predefined color segments having a predefined size.

14. The system of claim 9, wherein the processor is further configured to:
receive user-specified information associated with a location of a dermatologic condition on a human body; and
assign a location tag to the image based on the user-specified information.

15. The system of claim 9, wherein the processor is further configured to:
receive a panoramic image of a body part containing the dermatologic condition; and
map the image against the panoramic image to assign a location tag associated with the body part to the image.

16. A non-transitory computer-readable medium comprising instructions, which when executed by one or more processors, perform the following operations:
receive an image depicting a dermatologic condition and a swatch adjacent to the dermatologic condition;
normalize, based on the swatch in the image, the image to form a normalized image;
detect one or more parameters associated with the dermatologic condition based on the normalized image; and
store the normalized image together with the one or more parameters to a database.

17. A method for monitoring a dermatologic condition, the method comprising:
receiving an image depicting a dermatologic condition and a swatch adjacent to the dermatologic condition;
normalizing, by a processor, the image to form a normalized image, the normalizing including skewing the image till the swatch on the image has a predefined shape;
detecting one or more parameters associated with the dermatologic condition based on the normalized image; and
storing the normalized image together with the one or more parameters to a database.

18. The method of claim 17, wherein the normalizing further includes:
verifying that boundaries of the dermatologic condition and the boundaries of the swatch do not intersect and are within a frame of the image;
stretching the image till the swatch on the image has a predefined size; and
adjusting colors of the image till a plurality of predefined color segments of the swatch have predefined colors.

19. A method for monitoring a dermatologic condition, the method comprising:
receiving an image depicting a dermatologic condition and a swatch adjacent to the dermatologic condition;
normalizing, by a processor, the image to form a normalized image;
detecting one or more parameters associated with the dermatologic condition based on the normalized image;
storing the normalized image together with the one or more parameters to a database; and
comparing at least two temporally-different normalized images to detect one or more changes in the one or more parameters associated with the dermatologic condition.

20. The method of claim 19, further comprising:
searching the database to detect the at least two temporally-different normalized images of the dermatologic condition;
wherein the comparing of the at least two temporally-different normalized images is performed upon detecting the at least two temporally-different normalized images of the dermatologic condition.

21. A system for monitoring a dermatologic condition, the system comprising:
a processor;
a memory comprising computer-readable instructions for execution by the processor, wherein the processor is configured to:
receive an image depicting a dermatologic condition and a swatch adjacent to the dermatologic condition;
normalize the image to form a normalized image, the normalizing including skewing the image till the swatch on the image has a predefined shape;
detect one or more parameters associated with the dermatologic condition based on the normalized image; and
store the normalized image together with the one or more parameters to a database.

22. The system of claim 21, wherein the normalizing includes:
verifying that boundaries of the dermatologic condition and the boundaries of the swatch do not intersect and are within a frame of the image;

stretching the image till the swatch on the image has a predefined size; and adjusting colors of the image till a plurality of predefined color segments of the swatch have predefined colors.

23. A system for monitoring a dermatologic condition, the system comprising:

a processor;

a memory comprising computer-readable instructions for execution by the processor, wherein the processor is configured to:

receive an image depicting a dermatologic condition and a swatch adjacent to the dermatologic condition;

normalize the image to form a normalized image;

detect one or more parameters associated with the dermatologic condition based on the normalized image;

store the normalized image together with the one or more parameters to a database; and compare at least two temporally-different normalized images to detect one or more changes in the one or more parameters associated with the dermatologic condition.

24. The system of claim 23, wherein the processor is further configured to:

search the database to detect the at least two temporally-different normalized images of the dermatologic condition;

wherein the comparing of the at least two temporally-different normalized images is performed upon detecting the at least two temporally-different normalized images of the dermatologic condition.

* * * * *